Sept. 24, 1957  D. A. ELLIS ET AL  2,807,518
PROCESS FOR RECOVERY OF URANIUM AND VANADIUM FROM
CARBONATE SOLUTIONS BY REDUCTION-PRECIPITATION
Filed June 16, 1953

INVENTORS.
DAVID A. ELLIS
ROBERT O. LINDBLOM
BY
ATTORNEY.

United States Patent Office 2,807,518
Patented Sept. 24, 1957

2,807,518

PROCESS FOR RECOVERY OF URANIUM AND VANADIUM FROM CARBONATE SOLUTIONS BY REDUCTION-PRECIPITATION

David A. Ellis and Robert O. Lindblom, Concord, Calif., assignors, by mesne assignments, to the United States of America as represented by the United States Atomic Energy Commission Application June 16, 1953, Serial No. 361,938

17 Claims. (Cl. 23—14.5)

The present invention relates to a process for recovering uranium and vanadium and, more particularly, to an economical and efficient process employing carbonate leaching of ores and an advantageous method of recovering the uranium and vanadium from the leach solution.

Uranium and vanadium are often leached from various solids such as carnotite ores by means of carbonate solutions. The leach solutions contain many impurities, and it is difficult to remove the uranium and vanadium from such solutions without making the leach liquor totally unfit for recycling. Restoration of the leach solution after usual uranium and/or vanadium recovery is, therefore, usually very uneconomical.

Now, it has been discovered that the uranium and vanadium can be precipitated from such carbonate leach solutions by means of sodium amalgams or an equivalent reduction by electrolysis whereby the leach solution is left in a condition which is economical to replenish for recycling. The efficient operation of such reduction is entirely dependent on certain critical conditions of operation as will be more fully set forth hereinafter.

Accordingly, it is an object of the present invention to provide an economical carbonate leaching process for recovering uranium and vanadium from solid materials.

Another object of the invention is to provide a process for precipitating uranium and vanadium from carbonate leach solution by means of sodium amalgams employed under certain critical conditions.

A further object of the invention is to provide a method of precipitating uranium and vanadium from carbonate leach solutions such that economical recycling of the leach liquor is feasible.

A still further object of the invention is to provide a carbonate leach process for recovering uranium and vanadium from solid materials wherein sodium amalgam or an equivalent reduction by electrolysis is employed to precipitate the uranium and vanadium from the leach liquor and such leach liquor is recycled.

Other objects and advantages of the invention will become apparent from consideration of the following specification taken together with the accompanying drawing, of which:

Figure 2:
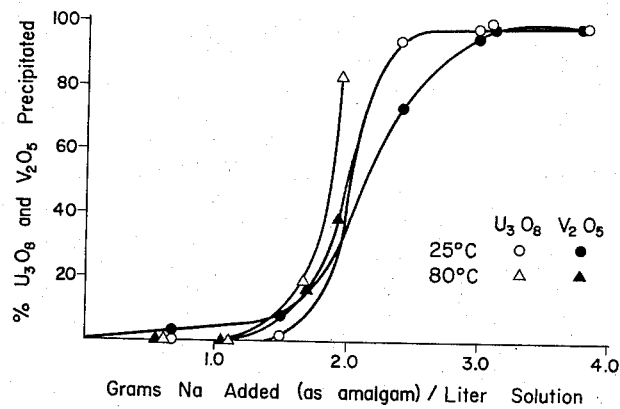
Figure 2 is a graphical illustration of the sodium amalgam precipitation of U and V from a salt-roast carbonate leach liquor.

In accordance with the invention, a solid uranium and vanadium containing material is subjected to customary preliminary processing steps such as grinding, roasting, etc. For example, in the case of carnotite ores the material is subjected to a roasting process. Such an ore contains uranium, vanadium and a wide variety of other materials. Ores which are low in vanadium are roasted at 500° C., which roasting process is terminated by quenching the heated ore in 5–10% $Na_2CO_3$ solution, allowing the ore to leach therein for several hours during which time the uranium and part of the vanadium go into solution. If the ore is rich in vanadium, efficient vanadium recovery becomes a realizable economic factor and, therefore, such ore is roasted at 800° C. with about 10% by weight of NaCl, to allow subsequent substantially complete solubilization of the vanadium. Following quenching and leaching, these latter leach solutions contain substantially all of the uranium and vanadium together with large amounts of NaCl.

Analyses of representative salt and non-salt roast leach liquors appear in Table I, which follows:

TABLE I

|  | Leach liquor A (non-salt roast liquor) | | Leach liquor B (salt roast liquor) |
|---|---|---|---|
|  | A-1 | A-2 | |
| $U_3O_8$, g./l. | 2.79 | 1.79 | 0.969 |
| $V_2O_5$, g./l. | 4.96 | 2.70 | 3.93 |
| $CO_3^=$, g./l. | 17.5 | 36.5 | 23.5 |
| $HCO_3^-$, g./l. | 12.5 | 12.0 | 7.5 |
| $SO_4^=$, g./l. | 29.8 | 12.0 | 1.42 |
| $Cl^-$, g./l. | 0.17 | 0.18 | 15.7 |
| Fe, g./l. | 0.009 | 0.015 | |
| $Al_2O_3$, g./l. | 1.8 | 0.0 | |
| $PO_4$, g./l. | 0.6 | 0.6 | |

The principal difficulty arising in the recycling of the leach liquors is with high vanadium ores or the accumulation of vanadium in the leach solution after several cyclic leachings of low vanadium ores. Vanadium is not precipitated by the usual treatment with sodium hydroxide which is often employed to precipitate the uranium. Ion exchange (anionic exchange) adsorption of the vanadium is ineffective in the presence of considerable chloride. The process of the invention may be employed to precipitate both the uranium and vanadium from either salt, non-salt roast leach solutions or other similar carbonate leach solutions.

In accordance with the invention, such a carbonate leach solution is treated with a dilute sodium amalgam wherein the sodium concentration is within a critical range so as to precipitate reduced forms of uranium and vanadium values. More specifically, there is employed an amalgam having a concentration of between about 0.01 to 0.5% of sodium therein. With concentrations of sodium below about 0.01% reduction is not effected and with concentrations above 0.5% excessive hydrogen is produced and the operation becomes uneconomic. Amalgams which contain about 0.05 to 0.30% of sodium produce optimum results and are therefore preferred. Such an amalgam may be produced in any appropriate manner. For example, the sodium can be added to mercury overlaid with a high boiling organic solvent such as xylene to exclude air or the amalgam may be produced by electrolysis of sodium salts or caustic soda using mercury as the cathode. An electrolytic cell through which the mercury may be passed as a flowing cathode is especially suitable for producing large amounts of the amalgam.

Efficiency of the solution treatment with the amalgam is dependent on at least three additional factors, i. e., intimacy of contact of the amalgam with the leach solution, rate of addition of the amalgam and exclusion of oxygen (air) as much as possible to prevent re-oxidation. The operation may be conducted in a relatively deep open vessel by adding the dilute amalgam dropwise and slowly while vigorously agitating the solution and dilute amalgam as by means of a centrifugal stirrer. The object of the agitation is to continuously dispense the amalgam in small droplets through the solution. Any other method which provides rapid and intimate contact between the amalgam and solution should produce an equivalent result.

As a result of the addition of the said amalgam, the uranium and vanadium are precipitated. A tabulated typical analysis of the precipitated product follows: U and V values are expressed in term of percent of specified oxides obtained in the analysis; however, the proximate form of the uranium and vanadium is not necessarily an oxide.

TABLE II

| | Percent |
|---|---|
| $U_3O_8$ | 16.7 |
| $V_2O_5$ | 21.8 |
| $CO_3^=$ | 8.1 |
| Na | 8.7 |
| Mo | 0.03 |
| Ti | 0.13 |
| Fe | 0.11 |

Following restoration of carbonate, if required, the solution from which the foregoing materials were precipitated is recycled to leach other ore.

The uranium and vanadium in such precipitate can be separated by a method similar to that disclosed in the copending application of Richard H. Bailes, et al., entitled "Uranium Recovery and Purification Process and Production of High Purity Uranium Tetrafluoride," Serial No. 362,123, filed June 16, 1953. For example, a sample of the precipitate was dissolved in 6 M HCl and an oxidizing agent, e. g., $NaClO_3$ was added to insure oxidation of the uranium to the +6 oxidation state, thereby forming chloridic anionic exchange resin adsorbable uranyl anions in the solution. HCl solutions of above 5 M, in general, are suitable for this purpose. It may be noted that handling or storage of the precipitate in the presence of air results in the oxidation of a considerable proportion if not all of the uranium; therefore, if the precipitate has been subjected to the oxidizing effect of air, it is not always necessary to employ an oxidizing agent as indicated above. However, it will be appreciated that oxidation is required either before or during the dissolution step to produce the necessary +6 oxidation state. $SO_2$ gas was bubbled through the solution to selectively reduce any pentavalent vanadium which might be present to the nonadsorbable +4 oxidation state. This solution was green in color and analyzed 3.6 g. of $U_3O_8$ and 6.2 g. $V_2O_5$ per liter. Then the solution was contacted with a strongly basic anionic exchange resin, e. g., Dowex-1, wherein the chloridic uranyl anions were adsorbed by the resin and the vanadium appeared in the effluent. Dowex 1 and 2, strongly basic anionic exchange resins employed in the various operations of the following descriptions and illustrative examples, are stated by the manufacturer to be equivalent in function and substantially the same. These materials are manufactured by procedures which are substantially the same as described in Examples 2 and 4 of U. S. Patent No. 2,614,099, filed December 29, 1948, and issued October 14, 1952. No appreciable amount of vanadium was adsorbed; however, the resin carried uranium equivalent to 100 mg. of $U_3O_8$ per ml. of resin. Impurities were removed from the resin by washing the column with 6 M HCl and then the uranium was eluted with water yielding a uranyl chloride solution having a peak concentration equivalent to 33 g. of $U_3O_8$ per liter. Ammonia was added to the eluate to precipitate the uranium and the precipitate was converted to $U_3O_8$ by calcining in air. Analysis of the product indicated a content of 90.8% of $U_3O_8$ and 0.095% $V_2O_5$. Evaporation of the effluent yielded a material which contained 18% of $V_2O_5$; however, standard precipitation processes would have yielded a product with a higher vanadium content.

It should be noted that the sodium amalgam produces a result that can not be obtained with other reducing agents. Powdered aluminum, iron, zinc, $H_2S$ gas, sodium sulfide, hydroxylamine sulfate and hydrazine hydrochloride were incapable of precipitating the U and V. Sodium hydrosulfide precipitated both U and V but only slowly and required the application of heat. Since these agents are representative of several general classes, it may be seen that the sodium amalgam is a specific and economical reducing agent for the desired operation.

A modification of this process is adapted to continuous operation and possesses advantages for use under certain conditions. Essentially, in this modification there is employed an electrolytic cell having a mercury cathode. The electrolyzing current is regulated to a rate such that the sodium content of the mercury cathode is within the above stated limits but, preferably, below about 0.15% to near the lower portion of the indicated concentration range. To conduct the electrolysis most efficiently the anode and cathode are separated by a porous partition to minimize reoxidation of the reduced solution by oxidizing materials formed at the anode. The leach solution can be processed batchwise or flowed continuously through the cathode compartment.

Consistent with the observations noted with sodium amalgam, mercury of amalgamated electrodes are specific for effective reductions. Stainless steel, aluminum, copper, lead and nickel cathodes were incapable of precipitating both the U and V. Amalgamated nickel, however, operated almost as efficiently as mercury alone.

Details of the operation of the process will become apparent from consideration of the following examples:

*Example I*

0.1 to 0.5% amalgams were produced by adding sodium to mercury overlayered with xylene or by electrolyzing NaCl in a mercury cathode cell. Then the amalgam, for example, a 0.2% sodium amalgam, was added dropwise at spaced intervals to the leach liquors disposed in beakers while agitating the mixture and dispersing the mercury through the leach solution with a centrifugal stirrer. Care was taken to minimize introduction of air as the precipitate can not form if oxygen is introduced in the solution. In most cases this was accomplished by using a small surface area tank having a large depth dimension. Overlayering with xylene or benzene also aids the exclusion of air.

Figure 3:
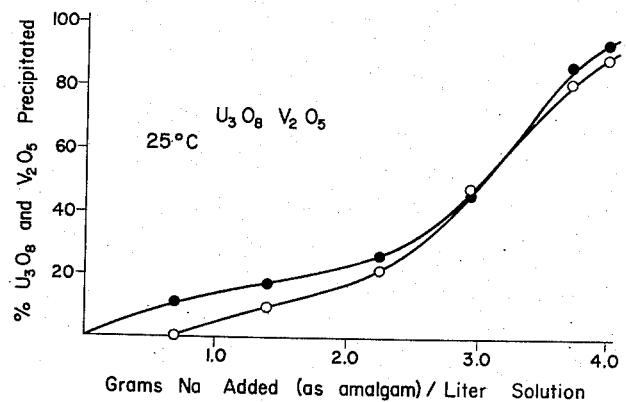
Figure 3 is a graphical illustration of a larger scale sodium amalgam precipitation of U and V from a non-salt roast carbonate leach liquor.
Figure 1:
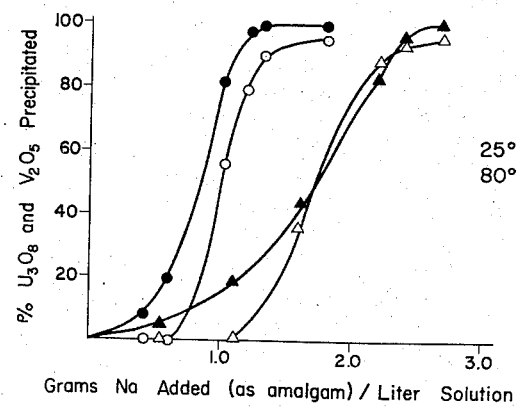
Figure 1 is a graphical illustration of the sodium amalgam precipitation of U and V from a non-salt roast carbonate leach liquor.

A series of 500 ml. leach liquor samples were processed in deep 1 liter beakers by the foregoing method, at 25° and at 80° C., the results of which are illustrated in the following figures of the accompanying drawing:

The curves of Fig. 1 are plots of uranium and vanadium precipitations from a non-salt roast leach solution containing U equivalent to 1.6 g. $U_3O_8$ and V equivalent to 2.7 g. $V_2O_5$, per liter;

The curves of Fig. 2 are plots of uranium and vanadium precipitations from a salt roast leach liquor containing U equivalent to 0.98 g. of $U_3O_8$ and V equivalent to 4.1 g., per liter;

Fig. 3 is a plot of U and V precipitation from 10 liters of non-salt roast leach liquor at 25° C. Relatively, more amalgam was required in this last case due to poor geometry of the reaction vessel and less efficient mixing.

*Example II*

Beaker cells having amalgamated nickel and mercury cathodes, respectively, were connected in series. The cathode compartments of each contained 400 ml. of liquor and the area of the mercury cathode was 75 sq. cm. while the amalgamated nickel screen cathode area was 116 sq. cms. The leach solution contained U equivalent to 1.7 g. of $U_3O_8$ and V equivalent to 2.6 g. $V_2O_5$ per liter in the beginning. At termination of seven hours of electrolysis, at 4 volts and 4 amps., the U content of the mercury cathode compartment liquor was equivalent to 3.0 mg. of $U_3O_8$/liter and V was equivalent to 0.16 g. of $V_2O_5$/liter. The concentrations in the amalgamated nickel cathode liquor were, respectively, 9.8 mg. of $U_3O_8$/liter and 0.16 g. of $V_2O_5$/liter.

Example III

A larger run was made employing a cell constructed of a 12 inch diameter battery jar using an asbestos diaphragm and a flat graphite anode. A mercury cathode was employed with 1 liter of leach solution similar to that of Example II. Filtrate from the cathode analyzed 21.3 mg. of $U_3O_8$ and 0.3 g. $V_2O_5$ per liter, after electrolysis for two hours at 3 volts and 4 amps. The precipitate, after desiccation, analyzed, equivalently, 21.4% of $U_3O_8$ and 38.3% of $V_2O_5$.

Example IV

A continuous cell was employed in this example. Such cell was constructed of a 3 in. diameter, 1 ft. long tube which was rubber stoppered at each end. A pool of mercury at the bottom formed the cathode, a graphite rod axially arranged in the tube formed the anode and asbestos paper formed the porous barrier. A leach liquor containing 1.08 g. of $V_3O_8$ and 2.06 g. of $V_2O_5$, per liter, was employed as both anolyte and catholyte. At a flow rate of 2 ml./min., the U content was reduced to 0.067 g./liter and V was reduced to 1.0 g./liter. The poor geometry of the cell was believed to cause the relatively poor V recovery.

While there has been described in the foregoing what may be considered to be preferred embodiments of the invention, modifications may be made therein without departing from the spirit of the invention and it is intended to cover all such as fall within the scope of the appended claims.

What is claimed is:

1. In a process for recovering U and V values from a solid material, the steps comprising leaching said material with a carbonate solution, contacting the leach liquor with a 0.01 to 0.5% sodium amalgam while excluding air therefrom thereby reducing and precipitating both the U and V values from the solution, and separating the precipitate from the solution.

2. In a process for recovering U and V values from a carnotite ore which has been subjected to a preliminary roasting treatment, the steps comprising contacting said ore with a 5 to 10% sodium carbonate solution to leach the U and V values therein, contacting the leach solution with a 0.01 to 0.5% sodium amalgam while excluding air therefrom thereby reducing and precipitating the U and V values from the solution, separating the precipitate from the the solution, and recycling the solution with a 0.01 to 0.5% sodium amalgam by dispensing.

3. In a process for recovering U and V values from a carnotite ore which has been subjected to a preliminary roasting treatment, the steps comprising contacting said ore with a 5 to 10% sodium carbonate solution to leach the U and V values therein, contacting the leach solution with a 0.1 to 0.5% sodium amalgam by dispensing the amalgam as small droplets therein and while excluding air therefrom thereby reducing and precipitating the U and V values from the solution, separating the precipitate from the solution, and recovering U and V from the precipitate.

4. The process as otherwise defined in claim 3 but wherein said sodium amalgam contains 0.05 to 0.30% of sodium.

5. In a process for recovering U and V values from a carnotite ore which has been subjected to a preliminary roasting treatment, the steps comprising leaching said ore with a carbonate solution, contacting the leach solution with a 0.01 to 0.5% sodium amalgam thereby reducing and precipitating the U and V values from the solution, separating the precipitate from the solution, dissolving the precipitate in HCl of above about 5 M concentration to form a solution containing chloridic uranyl anions and tetravalent vanadium, adsorbing the uranyl anions from the solution with a strongly basic anionic exchange resin leaving the vanadium in the effluent, eluting the uranium from the resin with water, recovering the uranium from the eluate, and recovering vanadium from the effluent.

6. In a process for recovering hexavalent uranium and pentavalent vanadium values from a carbonate leach solution, the step comprising contacting the solution with a sodium amalgam wherein there is contained between 0.01 and 0.5% of sodium while excluding air therefrom, whereby the uranium and vanadium are reduced and precipitated from the solution.

7. In a process for recovering U and V values from a roasted carnotite ore, the steps comprising leaching the U and V from said ore with a sodium carbonate solution of about 5–10% concentration, contacting the leach solution with a mercury cathode in an electrolytic cell wherein the electrolyzing current is regulated to maintain the sodium concentration in the mercury between 0.01 and 0.5% while excluding oxygen therefrom, whereby the U and V values are reduced and precipitated, and separating the precipitate from the solution.

8. The process as otherwise defined in claim 7 but wherein said mercury cathode comprises an amalgamated metal electrode.

9. The process as otherwise defined in claim 7 but wherein the said solution is recycled to leach other carnotite ore following separation of the precipitate therefrom.

10. The process as otherwise defined in claim 7 but wherein said electrolytic cell includes anode and cathode compartments separated by a porous diaphragm and wherein the leach solution is passed continuously through the cathode compartment.

11. In a process for recovering U and V values from an ore, the steps comprising leaching said ore with a carbonate solution, contacting the leach liquor with a 0.01 to 0.5% sodium amalgam thereby reducing and precipitating the U and V values from the solution, separating the precipitate from the solution, dissolving the precipitate in HCl of above about 5 M concentration with selective oxidation of the uranium to the +6 oxidation state and selective reduction of the vanadium to the +4 oxidation state, thereby forming chloridic uranyl anions and tetravalent vanadium cations in the solution, adsorbing the uranyl anions on a strongly basic anionic exchange resin leaving the vanadium in the effluent, washing impurities from the resin with HCl of about 6 M concentration, eluting uranium from the resin with water, and recovering the uranium and vanadium values from said eluate and the effluent respectively.

12. The process as defined in claim 11 wherein said sodium amalgam has a concentration in the range of about 0.05 to 0.30% of sodium.

13. The process as described in claim 11 wherein said leach solution from which the U and V values are precipitated is recycled to again leach the ore.

14. In a process for recovering U and V values from an ore, the steps comprising leaching said ore with a carbonate solution, contacting the leach liquor with a 0.01 to 0.5% sodium amalgam thereby reducing and precipitating the U and V values from the solution, separating the precipitate from the solution, dissolving the precipitate in HCl of above about 5 M concentration with selective oxidation of the uranium to the +6 oxidation state and selective reduction of the vanadium to the +4 oxidation state, thereby forming chloridic uranyl anions and tetravalent vanadium cations in the solution, adsorbing the uranyl anions on a strongly basic anionic exchange resin leaving the vanadium in the effluent, eluting uranium from the resin with water, and recovering the uranium and vanadium values from said eluate and the effluent respectively.

15. The process as defined in claim 11 wherein said sodium amalgam is provided as an amalgamated nickel electrode wherein the sodium is deposited by electrolysis.

16. In a process for recovering U and V values from a roasted carnotite ore, the steps comprising leaching the U and V from said ore with a carbonate solution of about 5-10% concentration, contacting the leach solution with a sodium amalgam cathode in an electrolytic cell wherein the electrolyzing current is regulated to maintain the sodium concentration in said cathode between 0.01 to 0.5%, whereby the U and V values are reduced and precipitated, dissolving the precipitate in HCl of above about 5 M concentration with oxidation to assure that the uranium forms a chloridic uranyl anion and with selective reduction to maintain the vanadium in the tetravalent state, contacting the solution with a strongly basic anionic exchange resin to adsorb the uranyl anions and leave the vanadium in the effluent, eluting the uranium with water, recovering the vanadium values from the effluent solution, and recovering the uranium from the eluate.

17. The process as defined in claim 16 wherein said electrolytic cell includes anode and cathode compartments separated by a porous diaphragm and wherein the leach solution is passed continuously through said cathode compartment.

References Cited in the file of this patent

UNITED STATES PATENTS 808,839  Haynes et al. _____ Jan. 2, 1906

OTHER REFERENCES

Hackh's Chemical Dictionary, pp. 262 and 779, 3rd Ed. (1950).

Bachelet et al.: Bulletin de la Societe Chimique de France, January–February 1952, pp. 55–60, particularly p. 59.